Feb. 8, 1949.  L. B. GREEN  2,461,320
BROACHING APPARATUS AND METHOD
Filed Dec. 11, 1943  3 Sheets-Sheet 1

INVENTOR.
BY LEE B GREEN
Kwis Hudson Boughton & Williams
ATTORNEYS

Feb. 8, 1949.                    L. B. GREEN                    2,461,320
                         BROACHING APPARATUS AND METHOD
Filed Dec. 11, 1943                                          3 Sheets-Sheet 2

INVENTOR.
LEE B. GREEN
BY
Kwis Hudson, Boughton & Williams
ATTORNEYS

Feb. 8, 1949.                    L. B. GREEN                    2,461,320
                    BROACHING APPARATUS AND METHOD
Filed Dec. 11, 1943.                                         3 Sheets-Sheet 3
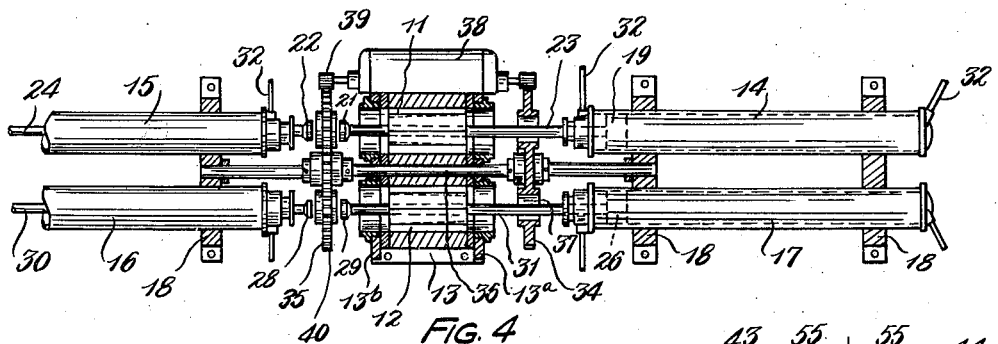
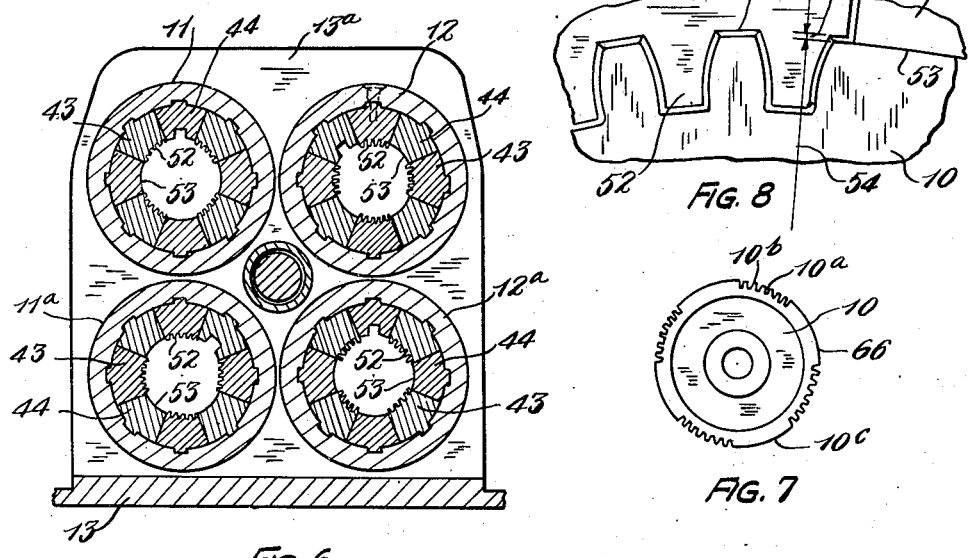
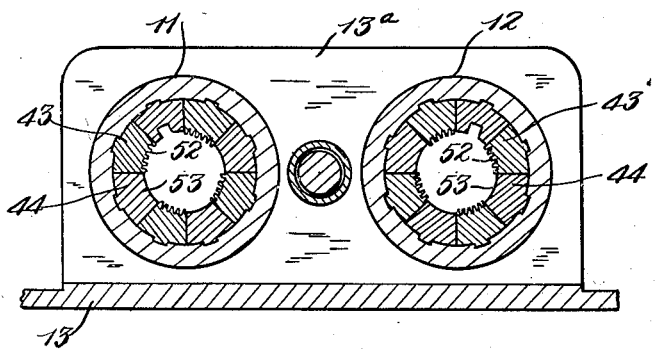
INVENTOR.
LEE B. GREEN
BY
Kwis Hudson Boughton & Williams
ATTORNEYS Patented Feb. 8, 1949

2,461,320

UNITED STATES PATENT OFFICE 2,461,320

BROACHING APPARATUS AND METHOD

Lee B. Green, Lakewood, Ohio

Application December 11, 1943, Serial No. 513,850

17 Claims. (Cl. 90—10)

This invention relates to the machining or finishing of various articles of manufacture and aims to provide a novel method and apparatus for carrying out such machining in a rapid and economical manner and which method and apparatus are especially applicable to the production of externally toothed articles such as spur gears and the like.

The method and apparatus herein disclosed represent an improvement over the method and apparatus disclosed in my earlier application, Serial No. 484,186, filed April 23, 1943 now Patent No. 2,382,628 granted August 14, 1945.

Another object of my invention is to provide a novel method and apparatus for external broaching in which complemental portions of a gear blank or the like are machined in successive stages so that upon completion of the staged movement such complemental portions will aggregate the entire portion to be machined.

A further object of the invention is to provide a broaching method and apparatus of this character in which the blank is guided and centered in a novel manner for the broaching operation.

Still another object of my invention is to provide a novel method and apparatus for machining gear blanks or the like in which alternate portions of the blank are machined in one stage with intermediate portions being used for guiding and centering the blank, and in a succeeding stage such intermediate portions are machined while the previously machined alternate portions are used for guiding and centering purposes.

Yet another object of this invention is to provide a novel form of die or external broach which can be used to advantage in my improved method and apparatus.

Other objects and advantages of the invention will be apparent from the following description when taken in conjunction with the accompanying sheets of drawings, wherein:

Fig. 4 is a plan view, with portions in section, showing a broaching machine embodying my novel form of external broach and with which my broaching method can be carried out.

Fig. 5 is a transverse sectional view of broaching apparatus of this kind in which a single pair of hollow broaches is used.

Fig. 6 is another transverse sectional view showing similar apparatus, in which two pairs of hollow broaches are used.

Fig. 7 is a plan view showing a blank or work piece of a form which can be economically machined or finished by my broaching method and apparatus, the blank being shown after the first stage of the broaching operation.

Fig. 8 is a detail view showing on a larger scale the cooperation of the cutting teeth with the blank and Fig. 9 is another plan view of the blank showing the same upon completion of the broaching operation.

Figure 1:
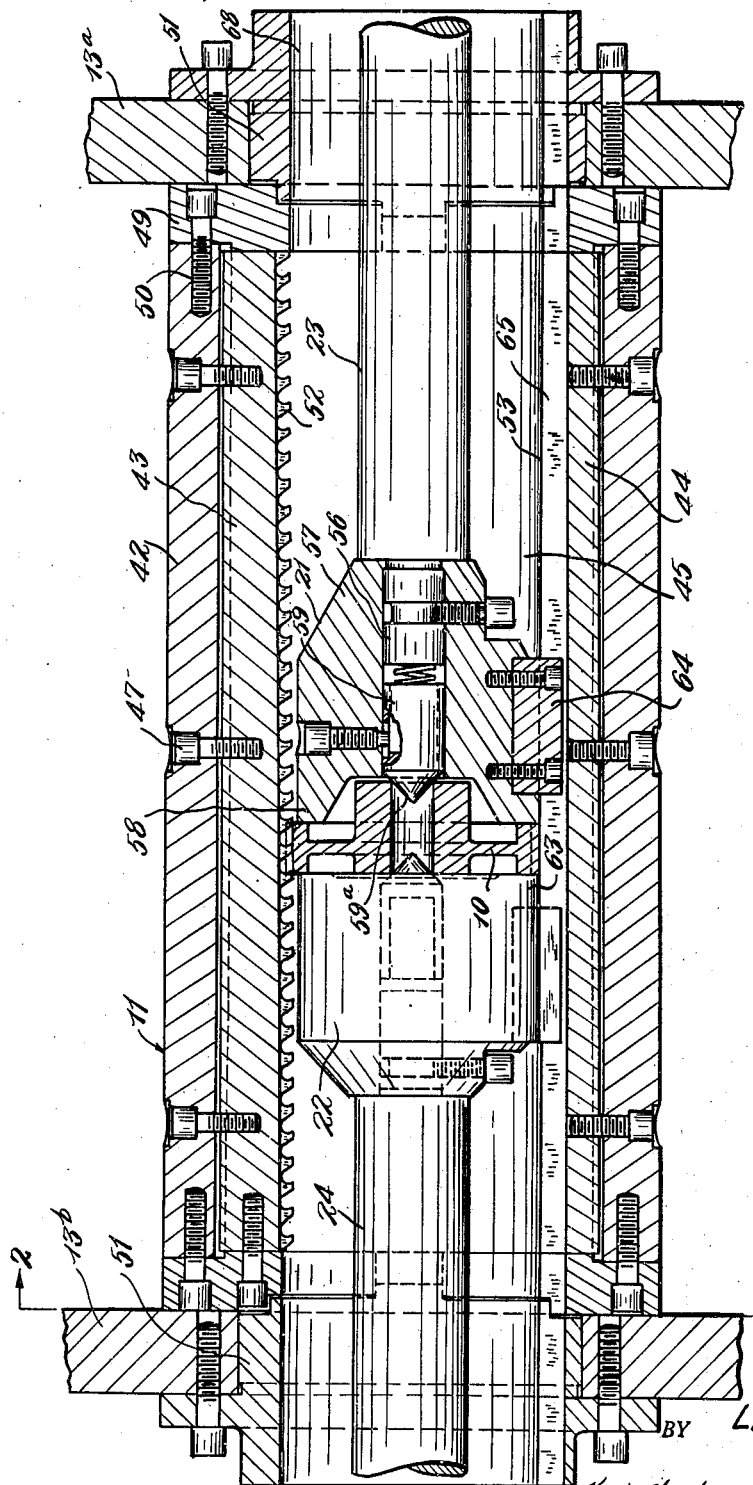
Fig. 1 is a longitudinal sectional view of a novel form of die or external broach adapted to be used in my improved apparatus and method, the view being taken as indicated by line 1—1 of Fig. 2.

As will be apparent from the following detailed description, my invention is applicable to the machining or finishing of a variety of work pieces of different sizes and shapes but is particularly useful in the production of externally toothed articles including gears, saws, ratchet wheels and the like. In Figs. 7 and 8 I show a spur gear 10 as an example of an article which can be economically machined or finished by the use of my invention, and in my method and apparatus hereinafter described in detail, the gear 10 represents the work piece or blank being operated upon.

Fig. 4 illustrates one way of carrying out my novel method and shows machining or external broaching apparatus, of the kind disclosed in said earlier application, embodying a plurality of elongated hollow dies or external broaches 11 and 12 in which the machining of the blank 10 is carried out in successive stages as explained in greater detail hereinafter. These broaches are disposed in adjacent or co-extensive relation with their axes substantially parallel and are suitably held in this relation as by being mounted in a frame 13.

At opposite ends of the broach 11 and in substantially co-axial alignment therewith are fluid cylinders 14 and 15, of which the cylinder 14 is a power cylinder and the cylinder 15 is a cushioning or resistance cylinder. Similarly, at opposite ends of the broach 12 are fluid cylinders 16 and 17 of which the cylinder 16 is a power cylinder and the cylinder 17 is a cushioning or resistance cylinder. These pairs of cylinders may be held in this desired co-axial alignment with the broaches 11 and 12 by suitable frame members 18.

Pistons 19 are reciprocably operable in the cylinders 14 and 15 and are connected respectively with a pair of cooperating chuck members 21 and 22 by means of piston rods 23 and 24 projecting from the adjacent ends of these cylinders. Pistons 26 are reciprocably operable in the cylinders 16 and 17 and are connected respectively with a pair of cooperating chuck members 28 and 29 by means of piston rods 30 and 31 projecting from the adjacent ends of these cylinders.

The pairs of cylinders 14, 15 and 16, 17 are preferably double-acting cylinders having pipe connections 32 adjacent their inner and outer ends through which motive fluid is supplied to or exhausted from the cylinders by appropriately controlling the flow of such motive fluid to and from the cylinders. The pairs of chuck members 21, 22 and 28, 29 can be made to clampingly grip the blanks 10 therebetween and push or carry the blanks while being thus clampingly held, through the broaches 11 and 12. Any suitable motive fluid can be used in the chuck actuating cylinders but I prefer to use hydraulic pressure in the power cylinders 14 and 16 and either hydraulic or air pressure in the cushioning or resistance cylinders 15 and 17.

The broaching apparatus and method illustrated in Fig. 4 can embody any desired number of broaches, for example, it can be provided with a single pair of broaches as indicated in Fig. 5 or can be provided with two pairs of broaches as shown in Fig. 6. When one pair of broaches is employed, such as the broaches 11 and 12 shown in Fig. 5, the machining of the article 10 is carried out in two successive stages. When two pairs of broaches are employed, such as the pairs of broaches 11, 11a and 12, 12a shown in Fig. 6, the machining of the article is carried out in four successive stages. These staged operations are described in greater detail hereinafter.

The apparatus shown in Fig. 4 also includes feed and transfer dials 34 and 35 located at opposite ends of the hollow broaches and mounted for rotation on a shaft or spindle 36. These dials have appropriate openings 37 therein adapted to receive the blanks 10 and to align the same with respect to the various broaches. The dials 34 and 35 are driven in timed relation to the actuation of the cooperating chuck members as described in greater detail in said earlier application. The driving means for the dials 34 and 35 may include a power device 38, having pinions 39 meshing with gears 40 provided on the dials.

Figure 2:
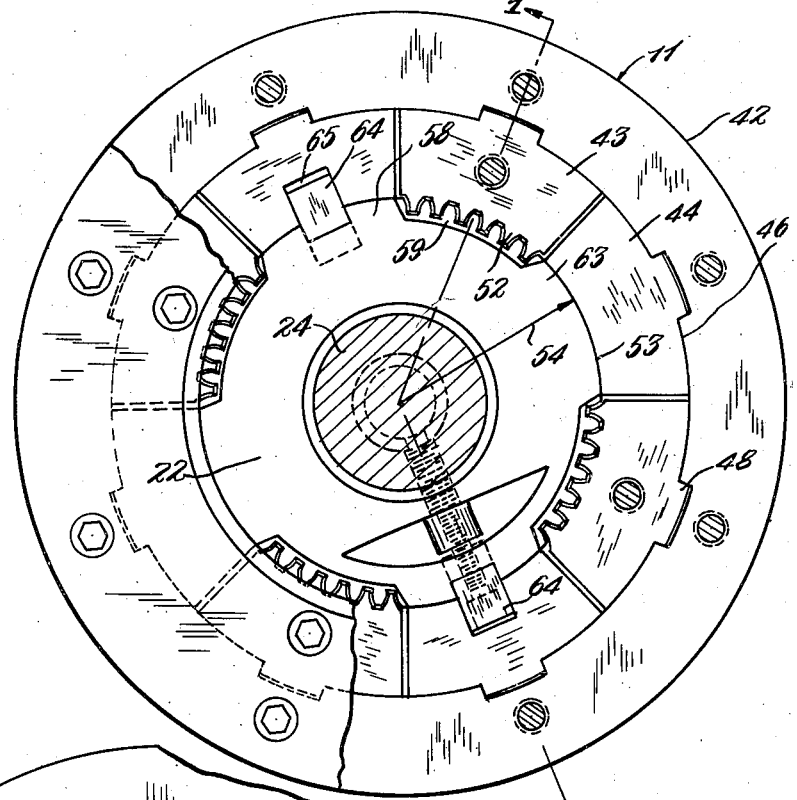
Fig. 2 is a transverse sectional view of such broach taken on line 2—2 of Fig. 1.
Figure 3:
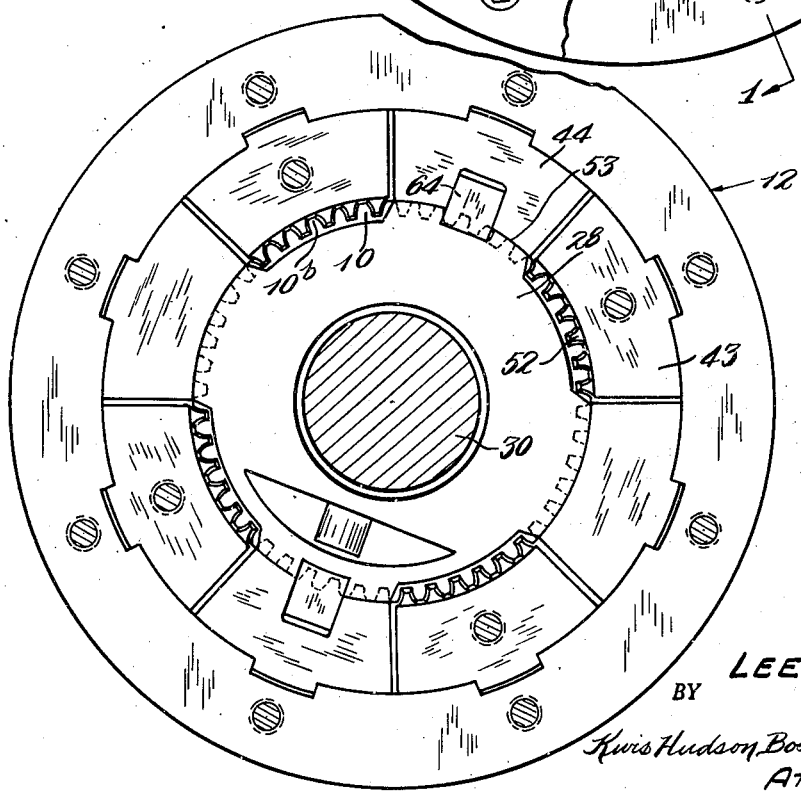
Fig. 3 is a similar sectional view showing another such external broach for use in paired or staged relation with the broach of Figs. 1 and 2.

An important part of my improved broaching apparatus and method is the novel construction and manner of using the broaching dies 11 and 12 and which will now be described in greater detail. As shown in Figs. 1 to 3 inclusive each of the broaches 11 and 12 comprises an outer housing or sleeve 42 in which a plurality of longitudinally extending sections or segments 43 and 44 are mounted in an annular series so as to define a longitudinal passage 45 through which the chuck members 21 and 22 (23 and 24 for the broach 12) and the blank 10 are axially movable. The segments 43 and 44 are transversely curved and are fixedly mounted in the housing 42 by being held in seating engagement with the inner surface 46 thereof by means of the screws 47. The segments are held against annular shifting in the housing by means of an interfitting engagement with the latter, as indicated at 48, and are held against axial movement by the end plates 49 which are connected with the housing by screws 50. The broaches 11 and 12 have their ends in abutting relation with the frame 13 and are mounted in the upright portions 13a and 13b of the latter by means of the aligning or guiding sleeves 51 to which further reference will presently be made. As shown in the drawings a full annular series of the segments 43 and 44 is provided in each of the tubular outer bodies 11 and 12 so as to define tubular sleeves therein.

Alternate segments of the annular series, in this instance the segments 43, are provided with cutting teeth 52 and the intermediate segments 44 serve as a guiding and centering means for the chuck members 21 and 22 and the blank 10. The cutting teeth 52 are arranged in axially extending rows which are spaced circumferentially of the broach to correspond with the recesses or spaces 10a between the pairs of teeth 10b of the blank. The cutting teeth 52 are of a shape or contour to produce teeth and recesses of a desired shape on the blank and are of progressively varying height such that the axial movement of the blank through the passage 45 of the broach in a direction from right to left as seen in Fig. 1, will result in a progressive shaping of the gear teeth 10b and deepening of the recesses 10a. It will be noted in this connection that the radial distance of the tops of the cutting teeth 52 from the axis of the broach 11 is less at the right hand end than at the left hand end and the difference between these measurements will depend upon the height of the teeth to be cut or generated on the blank.

The intermediate segments 44 are plain segments, that is to say they do not have any cutting teeth thereon but are provided with smooth or plain surfaces 53 which serve as guiding and centering surfaces for holding the chuck members and the blank 10 in properly centered relation during movement through the passage 45 of the broach. The guide surfaces 53 are preferably located a radial distance 54 from the axis of the broach such that the rim or periphery 10c of the blank will be in sliding engagement therewith. Usually the rim or periphery 10c of the blank 10 is in a condition such that it is not necessary to machine the tops of the gear teeth during the broaching operation and hence, the cutting teeth 52 are usually of a height such that clearance spaces 55 are left between the segments 43 and the tops of the gear teeth 10b being formed or generated on the blank.

The chuck members 21 and 22 are similar in form and each comprises a body 57 mounted on an extension 56 of the corresponding piston rod. Each chuck member has an annular rim portion or end face 58 which cooperates with a similar portion of the adjacent chuck member for exerting a clamping action on the blank 10 at a point adjacent the rim or periphery of the latter. The engagement of the chuck members with the blank at this point results in the blank being securely clamped and held adjacent the portions thereof which are acted upon by the cutting teeth 52 of the broach. By holding the blank in this manner all distortion, vibration or chattering of the blank is prevented during the broaching operation and consequently the formation of the teeth is carried out in a very smooth and accurate manner. The chuck members 21 and 22 are provided with spring-pressed axially movable plungers 59 having tapered ends 59a which engage in the hub opening of the blank 10 and center the latter with respect to the axis of the chuck as the chuck members close into clamping engagement with the blank.

As shown in Fig. 2 the outer surfaces of the chuck members 21 and 22 have spaced recesses 60 therein located to correspond with the toothed segments 43 and which provide clearance spaces for the cutting teeth 52. The intermediate portions 63 of the periphery of the chuck members form lands or followers which have their tops in sliding engagement with the guide surfaces 53 of the plain segments 44. This sliding engagement causes the chuck members to be accurately guided and centered in the broach during movement of the chuck and blank through the passage 45. Relative annular shifting between the broach and the chuck is prevented by providing the chuck members 21 and 22 with one or more guide shoes or keys 64 which slidably engage in corresponding longitudinal slots or keyways 65 formed in certain of the segments 44 of the broach. The slots 65 also extend through the end plates 49 and the guiding sleeves 51. Since the keys 64 engage in the slots 65 during the full length of the broaching operation, it will be seen that annular shifting of the blank will be prevented and the teeth 10b thereof will be accurately formed.

Fig. 7 shows the blank 10 in a partially completed condition which is the condition of the blank after it has been moved through the broach 11. As shown in this view the blank will then have groups of teeth 10b cut therein at peripheral points spaced to correspond with the toothed segments 43. The intervening peripheral portions 66 which were in guiding and centering engagement with the plain or guide segments 44 during passage of the blank through the broach 11 have not yet been subjected to a machining or broaching action. These unbroached intervening portions 66 are preferably of the same arcuate length as, and are complemental to, the spaced portion on which teeth have already been cut.

When the partially completed blank of Fig. 7 is carried from the broach 11 by the chuck members 21 and 22 it is deposited in one of the openings 37 of the transfer dial 35 by which it is moved to a position in alignment with the broach 12. The chuck members 28 and 29 pick up the partially completed blank from the opening of the transfer dial and carry it in a reverse direction through the broach 12. During this return movement, teeth are cut or generated in the intermediate portions 66 of the blank in the same manner as described above for the cutting of the teeth by the broach 11.

As will be seen from Fig. 3 the broach 12 and the chuck members 28 and 29 operable therein are similar in construction to the broach 11 but the toothed segments 43 of the broach 12 are annularly offset with respect to the toothed segments of the broach 11 so as to cut teeth in the intermediate portions 66 of the blank 10 as just mentioned above. The plain segments 44 of the broach 12 are also annularly offset with respect to the corresponding segments of the broach 11 and during the movement of the blank through the broach 12 the teeth previously cut on the blank are in sliding engagement with the guide surface 53 and assist in guiding and centering the blank during this second step or stage of the broaching operation. The chuck members 28 and 29 are also guided and centered in the broach 12 in the same manner as the chuck members 21 and 22 of the broach 11.

Fig. 9 shows the blank 10 after the second stage of the broaching operation, that is, after its return movement through the broach 12. As shown in this view all of the teeth have been fully formed on the blank. After being moved through the broach 12 the completed blank is carried by the chuck members 28 and 29 to the dial 34 and is deposited in one of the openings 37 thereof. The dial 34 then moves the completed blank to a discharge station where it is removed from the dial. Although I have described my staged broaching operation as using one or more transfer dials for handling the blanks, it will be understood, of course, that these dials could be omitted and the blanks could be fed and transferred by manual operations.

I have stated above that the sleeves 51 by which the hollow broaches are mounted in the frame members 13a and 13b perform a guiding function. These sleeves cooperate with the end rings 49 in forming guide passages 68 at the ends of the broaches and which passages are aligned with the main passage 45. At the beginning of each broaching operation the guide passages 68 serve to properly align and center the chuck and blank prior to the engagement of the blank with the cutting teeth 52. It will be noted in this connection that one of the cooperating members of the chuck will still be in sliding engagement with the passage 68 at the time that the blank 10 comes into initial cutting engagement with the teeth 52. This will insure the blank being properly started through the broach.

As mentioned above Fig. 6 shows an arrangement in which two pairs of hollow broaches are employed. In this arrangement the broaches 11 and 11a constitute one pair and the broaches 12 and 12a constitute the second pair. In the first of the four steps or stages of this broaching operation the blank is moved in a forward direction through the broach 11 and during this movement teeth are cut to a partial depth in a plurality of areas which, in spacing and number, correspond with the annular spacing of the toothed segments 43. During the second stage the blank is moved in the reverse direction through the broach 11a and the toothed segments 43 of this broach cut teeth to a partial depth on the portions of the blank lying between the previously cut groups of teeth. In the third step of the operation the blank is again moved forward through the broach 12a and during this movement the teeth which were partially cut in the broach 11 are completed by the toothed segments 43 of the broach 12a. The fourth step consists in returning the blank through the broach 12 during which movement the teeth which were partially cut in the broach 11a are completed by the toothed segments 43 of the broach 12. During these four steps the blank is held between cooperating chuck members and is centered and guided in the same manner as explained above in connection with the broach 11 of Fig. 1. Likewise the blank can be handled and transferred either manually or by the use of the dials 34 and 35 as above described.

From the foregoing description and the accompanying drawings it will now be readily understood that I have provided an improved broaching method and apparatus by which accurately formed gears or other externally toothed articles can be produced in a rapid and economical manner. It will also be seen that I have provided an improved form of hollow broach which can be used to advantage in my apparatus and method and in which the proper guiding and centering of the blank is assured.

While I have illustrated and described my improved broaching method and apparatus in considerable detail, it will be understood, of course, that I do not wish to be correspondingly limited but regard my invention as including all changes and modifications coming within the spirit of the invention and the scope of the appended claims.

Having thus described my invention, I claim:

1. The method of broaching which comprises advancing a gear blank or the like through a hollow broach, machining certain portions of the blank during the advance movement and simultaneously using other portions of the blank for slidably supporting and centering the blank in the hollow broach during the advance movement, and then subjecting the blank to another such advance movement and machining said other portions and simultaneously using the previously machined portions of the blank for slidably supporting and centering the blank in the hollow broach during the second advance movement.

2. The method of broaching which comprises advancing a gear blank or the like through a hollow broach, machining spaced portions of the blank during the advance movement and simultaneously using alternate portions of the blank for slidably supporting and centering the blank in the hollow broach during the advance movement, and then subjecting the blank to another such advance movement and machining said alternate portions and simultaneously using the previously machined space portions for slidably supporting and centering the blank in the hollow broach during the second advance movement.

3. The method of broaching which comprises holding a gear blank by clamping pressure applied to opposite sides and adjacent the periphery thereof, advancing the blank while thus held in a hollow broach and machining alternate portions only of the periphery of the blank during such advance movement and simultaneously using the portions intermediate said alternate portions for slidably supporting and centering the blank in said broach, and again moving the blank while thus clampingly held through a hollow broach and machining said intermediate portions while using the previously machined alternate portions for slidably supporting and centering the blank.

4. In apparatus of the character described, a tubular outer body, a full annular series of longitudinally extending transversely curved segments disposed in coextending contiguous relation to each other and mounted in said tubular outer body so as to define an inner sleeve therein in which one or more of said segments carrying cutting teeth and one or more of the remaining segments provide a work guiding means.

5. A hollow broach comprising a tubular outer body, a full annular series of longitudinally extending transversely curved segments disposed in coextending contiguous relation to each other and mounted in said tubular outer body so as to define an inner sleeve therein, alternate segments of the series having cutting teeth thereon and the intermediate segments of the series having work guiding and centering surfaces thereon.

6. In broaching apparatus, an elongated hollow broach having cutting means therein, a chuck adapted to carry a blank to be machined and being movable axially in said broach for engaging the blank with said cutting means, and cooperating key and keyway elements on the outer perimeter of said chuck and inner perimeter of said broach for aligning the chuck with respect to the broach during such movement.

7. In broaching apparatus, an elongated hollow broach having annularly spaced longitudinally extending groups of cutting teeth and longitudinally extending guide means between said groups of cutting teeth, a chuck comprising cooperating members adapted to clampingly carry a blank to be machined and being movable axially in said hollow broach with portions of the blank engaging said cutting teeth and other portions engaging said guide means, and cooperating key and keyway elements on the outer perimeter of said chuck and the inner perimeter of said broach for aligning the chuck with respect to the broach during such movement, the aligning elements of said broach extending longitudinally thereof and being located on said longitudinally extending guide means.

8. In broaching apparatus, an elongated hollow broach having annularly spaced longitudinally extending groups of cutting teeth and longitudinally extending guide means between said groups of cutting teeth, a chuck comprising cooperating members adapted to clampingly carry a blank to be machined and being movable axially in said hollow broach with portions of the blank engaging said cutting teeth and other portions engaging said guide means, and cooperating key and keyway elements on said chuck and broach and preventing annular shifting therebetween during the broaching operation.

9. In broaching apparatus, an elongated hollow broach having therein annularly spaced longitudinally extending toothed sections and longitudinally extending guide means between one or more pairs of said toothed sections, and a chuck shiftable axially in said broach for moving a blank along said toothed sections in cutting engagement therewith, said chuck having annularly spaced peripheral recesses located to correspond with said toothed sections and having follower means on its periphery between one or more pairs of said peripheral recesses for cooperation with said guide means.

10. In broaching apparatus, an elongated hollow broach having therein annularly spaced longitudinally extending toothed sections and longitudinally extending guide means between each pair of said toothed sections, and a chuck shiftable axially in said broach for moving a blank along said toothed sections in cutting engagement therewith, said chuck having annularly spaced peripheral recesses located to correspond with said toothed sections and having follower means on its periphery between each pair of said recesses for guiding and centering cooperation with said guide means.

11. In broaching apparatus, an elongated hollow breach having therein annularly spaced longitudinally extending toothed sections and longitudinally extending guide means between one or more pairs of said toothed sections, a chuck shiftable axially in said broach for moving a blank along said toothed sections in cutting engagement therewith, said chuck having annularly spaced peripheral recesses located to correspond with said toothed sections and having follower means between one or more pairs of said recesses for cooperation with said guide means, and cooperating key and keyway elements on said guide and follower means for holding the broach and chuck against relative annular shifting.

12. In broaching apparatus, a plurality of hollow broaches each having annularly spaced longitudinally extending groups of cutting teeth, the groups of cutting teeth of one broach being annularly offset with respect to the groups of another of said broaches, the offset relation and the width of the tooth groups being such that the tooth groups for the two broaches together aggregate a full broaching periphery for the blank to be broached, means for moving a blank through said hollow broaches in succession, and transfer means adapted to receive the blank from said one broach and to align the blank with respect to the succeeding broach.

13. The method of broaching which comprises advancing a gear blank or the like through hollow broaching means, machining spaced portions of the blank during the advance movement and simultaneously using alternate portions of the blank for slidably supporting and centering the same in the hollow broaching means during the advance movement, rotating the blank about its axis, after the first advance movement, through an angular distance corresponding with the angular spacing of said spaced and alternate portions, and then subjecting the blank to another such advance movement through the hollow broaching means and machining said alternate portions and simultaneously using the previously machined spaced portions for slidably supporting and centering the blank in the hollow broaching means during the second advance movement.

14. A hollow broach comprising a tubular outer body, and a full annular series of longitudinally extending transversely curved segments carrying cutting teeth and disposed in coextending contiguous relation to each other, said segments being mounted in said outer body so as to form an inner sleeve therein.

15. In broaching apparatus, an elongated hollow broach having annularly spaced longitudinally extending groups of cutting teeth and longitudinally extending guide means between said groups of cutting teeth, a chuck comprising cooperating members adapted to clampingly hold an annular blank to be machined, said chuck being movable axially in said broach for advancing said blank therein, means on said chuck and engageable with the blank for centering the latter with respect to the chuck, and means on the chuck for sliding engagement with the guide means of the broach for guiding and centering the chuck in the broach.

16. In broaching apparatus, an elongated hollow broach having annularly spaced longitudinally extending groups of cutting teeth and longitudinally extending guide means between said groups of cutting teeth, a chuck comprising cooperating members adapted to clampingly hold therebetween an annular blank having a central opening, said chuck being movable axially in said broach for advancing said blank therein, means on said chuck for sliding engagement with the guide means of the broach for guiding and centering the chuck in the broach, and a plunger axially movable in said chuck and having a tapered end engageable in said central opening for centering the blank relative to the chuck.

17. In broaching apparatus, a pair of hollow broaches each having annularly spaced longitudinally extending groups of internal cutting teeth and longitudinally extending internal guide means between said groups, the groups of cutting teeth of one broach being annularly offset with respect to the groups of the other of said broaches and being of a width substantially equal to the width of the intervening spaces of said other broach, a chuck adapted to clampingly carry an annular blank to be machined and being axially movable in one of said broaches for causing alternate portions of the rim of the blank to be machined by the spaced groups of cutting teeth of said one broach, means on said chuck for sliding engagement with the guide means of said one broach for guiding and centering the chuck therein, a second chuck adapted to clampingly carry said annular blank and being axially movable in said other broach for causing the intermediate portions of the rim of said blank to be machined by the spaced groups of cutting teeth of said other broach, and means on said second chuck for sliding engagement with the guide means of said other broach for guiding and centering the second chuck therein.

LEE B. GREEN.

REFERENCES CITED

The following references are of record in the file of this patent:

UNITED STATES PATENTS

| Number | Name | Date |
|---|---|---|
| 772,841 | Smith | Oct. 18, 1904 |
| 1,070,561 | Walker | Aug. 19, 1913 |
| 1,300,092 | Acton | Apr. 8, 1919 |
| 1,318,102 | Oakley | Oct. 7, 1919 |
| 1,429,398 | Barth | Sept. 19, 1922 |
| 1,527,697 | Olsson | Feb. 24, 1925 |
| 1,935,775 | Halborg | Nov. 21, 1933 |
| 2,106,212 | Halborg | Jan. 25, 1938 |
| 2,115,186 | Yager | Apr. 26, 1938 |
| 2,194,595 | Hart | Mar. 26, 1940 |